(12) United States Patent
Yerramalli et al.

(10) Patent No.: US 10,856,296 B2
(45) Date of Patent: Dec. 1, 2020

(54) TECHNIQUES AND APPARATUSES FOR DETERMINING CHANNELS FOR FREQUENCY HOPPING IN AN UNLICENSED RADIO FREQUENCY SPECTRUM BAND

(71) Applicant: QUALCOMM Incorporated, San Diego, CA (US)

(72) Inventors: Srinivas Yerramalli, San Diego, CA (US); Tamer Kadous, San Diego, CA (US); Chih-Hao Liu, San Diego, CA (US); Mostafa Khoshnevisan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 3 days.

(21) Appl. No.: 15/980,568

(22) Filed: May 15, 2018

(65) Prior Publication Data
US 2019/0007946 A1 Jan. 3, 2019

Related U.S. Application Data

(60) Provisional application No. 62/526,121, filed on Jun. 28, 2017.

(51) Int. Cl.
| | |
|---|---|
| *H04W 4/00* | (2018.01) |
| *H04W 72/04* | (2009.01) |
| *H04L 5/00* | (2006.01) |
| *H04B 1/713* | (2011.01) |
| *H04W 76/27* | (2018.01) |

(Continued)

(52) U.S. Cl.
CPC ........ *H04W 72/0453* (2013.01); *H04B 1/713* (2013.01); *H04L 5/0098* (2013.01); *H04W 16/14* (2013.01); *H04W 16/32* (2013.01); *H04W 68/02* (2013.01); *H04W 76/27* (2018.02);
(Continued)

(58) Field of Classification Search
CPC ...... H04B 1/713; H04W 16/14; H04W 48/12; H04W 72/053; H04L 5/0098
See application file for complete search history.

(56) References Cited

U.S. PATENT DOCUMENTS

| | | |
|---|---|---|
| 8,861,452 B2 | 10/2014 | Barbieri et al. |
| 2016/0249222 A1* | 8/2016 | Li .......................... H04B 1/713 |

(Continued)

FOREIGN PATENT DOCUMENTS

| | | |
|---|---|---|
| EP | 3337272 A1 | 6/2018 |
| WO | 2017100355 A1 | 6/2017 |

OTHER PUBLICATIONS

International Search Report and Written Opinion—PCT/US2018/032961—ISA/EPO—dated Aug. 24, 2018.

*Primary Examiner* — Bo Hui A Zhu
(74) *Attorney, Agent, or Firm* — Harrity & Harrity, LLP

(57) ABSTRACT

Some techniques described herein assist a user equipment with acquiring and/or reacquiring, from a base station, a dynamic list of channels to be used for frequency hopping when communicating over an unlicensed radio frequency spectrum band, thereby increasing communication reliability and promoting coexistence in the unlicensed radio frequency spectrum band. Some techniques described herein also assist the user equipment in obtaining the list of channels with low latency (e.g., shortly after the list has changed) and with low power consumption. Numerous other aspects are provided.

30 Claims, 12 Drawing Sheets

(51) Int. Cl.
*H04W 16/14* (2009.01)
*H04W 16/32* (2009.01)
*H04W 68/02* (2009.01)
*H04W 48/12* (2009.01)

(52) U.S. Cl.
CPC ............ *H04L 5/001* (2013.01); *H04L 5/0053* (2013.01); *H04W 48/12* (2013.01)

(56) References Cited

U.S. PATENT DOCUMENTS

| | | |
|---|---|---|
| 2017/0163391 A1 | 6/2017 | Kimura et al. |
| 2018/0020452 A1* | 1/2018 | Yerramalli ............ H04W 52/143 |
| 2018/0027483 A1* | 1/2018 | You ........................ H04L 5/0053 370/336 |

* cited by examiner

TECHNIQUES AND APPARATUSES FOR DETERMINING CHANNELS FOR FREQUENCY HOPPING IN AN UNLICENSED RADIO FREQUENCY SPECTRUM BAND

CROSS-REFERENCE TO RELATED APPLICATIONS UNDER 35 U.S.C. § 119

This application claims priority to U.S. Provisional Patent Application No. 62/526,121, filed on Jun. 28, 2017, entitled "TECHNIQUES AND APPARATUSES FOR DETERMINING CHANNELS FOR FREQUENCY HOPPING IN AN UNLICENSED RADIO FREQUENCY SPECTRUM BAND," which is hereby expressly incorporated by reference herein.

BACKGROUND

Field

Aspects of the present disclosure generally relate to wireless communication, and more particularly to techniques and apparatuses for determining channels for frequency hopping in an unlicensed radio frequency spectrum band.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

When communicating in an unlicensed radio frequency (RF) spectrum band, a UE may need to account for potential interference from other devices operating on the unlicensed RF spectrum band, and/or may need to operate to coexist or share the unlicensed RF spectrum band with other devices. One way to promote coexistence with other devices is to use a listen before talk procedure to measure channel conditions before communicating on a channel. In some cases, the listen before talk procedure may be combined with frequency hopping, where the UE hops among channels to increase the likelihood of finding a clear channel for communication. This frequency hopping may be performed according to a frequency hopping pattern that is known to both the UE and a base station with which the UE communicates, so that communications can be successfully received.

In some cases, a particular set of channels may have better channel conditions than other channels, and so may be better suited for communications between the UE and the base station. This set of channels may be communicated by the base station to the UE using a list, which may change over time as channel conditions change. Thus, a UE may need to acquire the list of channels from the base station when the UE initially connects to the base station, and may need to reacquire the list of channels when the list of channels changes. Some techniques described herein assist with acquiring and/or reacquiring a dynamic list of channels to be used to communicate using frequency hopping over an unlicensed RF spectrum band, thereby increasing communication reliability and promoting coexistence in the unlicensed RF spectrum band. Some techniques described herein also assist the UE in obtaining the list of channels with low latency (e.g., shortly after the list has changed) and with low power consumption.

In an aspect of the disclosure, a method, a UE, a base station, an apparatus, and a computer program product are provided.

In some aspects, the method may include receiving, by a UE, a master information block (MIB) that indicates a location of one or more system information blocks (SIBs); receiving, by the UE, the one or more SIBs based at least in part on the MIB, wherein the one or more SIBs indicate a list of channels for frequency hopping in an unlicensed radio frequency spectrum band; and communicating, by the UE, by frequency hopping on a plurality of channels, included in the list of channels, based at least in part on the indication in the one or more SIBs.

In some aspects, the method may include transmitting, by a base station, a MIB that indicates a location of one or more SIBs; transmitting, by the base station, the one or more SIBs, wherein the one or more SIBs indicate a list of channels permitted for use by a UE for frequency hopping in an unlicensed radio frequency spectrum band; and communicating, by the base station, with the UE using a plurality of channels included in the list of channels.

In some aspects, the UE may include a memory and one or more processors coupled to the memory. The memory and the one or more processors may be configured to receive a MIB that indicates a location of one or more SIBs; receive the one or more SIBs based at least in part on the MIB, wherein the one or more SIBs indicate a list of channels for frequency hopping in an unlicensed radio frequency spectrum band; and communicate by frequency hopping on a plurality of channels, included in the list of channels, based at least in part on the indication in the one or more SIBs.

In some aspects, the base station may include a memory and one or more processors coupled to the memory. The memory and the one or more processors may be configured to transmit a MIB that indicates a location of one or more SIBs; transmit the one or more SIBs, wherein the one or more SIBs indicate a list of channels permitted for use by a UE for frequency hopping in an unlicensed radio frequency spectrum band; and communicate with the UE using a plurality of channels included in the list of channels.

In some aspects, the apparatus may include means for receiving a MIB that indicates a location of one or more SIBs; means for receiving the one or more SIBs based at least in part on the MIB, wherein the one or more SIBs indicate a list of channels for frequency hopping in an unlicensed radio frequency spectrum band; and means for communicating by frequency hopping on a plurality of channels, included in the list of channels, based at least in part on the indication in the one or more SIBs.

In some aspects, the apparatus may include means for transmitting a MIB that indicates a location of one or more SIBs; means for transmitting the one or more SIBs, wherein the one or more SIBs indicate a list of channels permitted for use by a UE for frequency hopping in an unlicensed radio frequency spectrum band; and means for communicating with the UE using a plurality of channels included in the list of channels.

In some aspects, the computer program product may include a non-transitory computer-readable medium storing one or more instructions for wireless communication. The one or more instructions, when executed by one or more processors, may cause the one or more processors to receive a MIB that indicates a location of one or more SIBs; receive the one or more SIBs based at least in part on the MIB, wherein the one or more SIBs indicate a list of channels for frequency hopping in an unlicensed radio frequency spectrum band; and communicate by frequency hopping on a plurality of channels, included in the list of channels, based at least in part on the indication in the one or more SIBs.

In some aspects, the computer program product may include a non-transitory computer-readable medium storing one or more instructions for wireless communication. The one or more instructions, when executed by one or more processors, may cause the one or more processors to transmit a MIB that indicates a location of one or more SIBs; transmit the one or more SIBs, wherein the one or more SIBs indicate a list of channels permitted for use by a UE for frequency hopping in an unlicensed radio frequency spectrum band; and communicate with the UE using a plurality of channels included in the list of channels.

Aspects generally include a method, apparatus, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
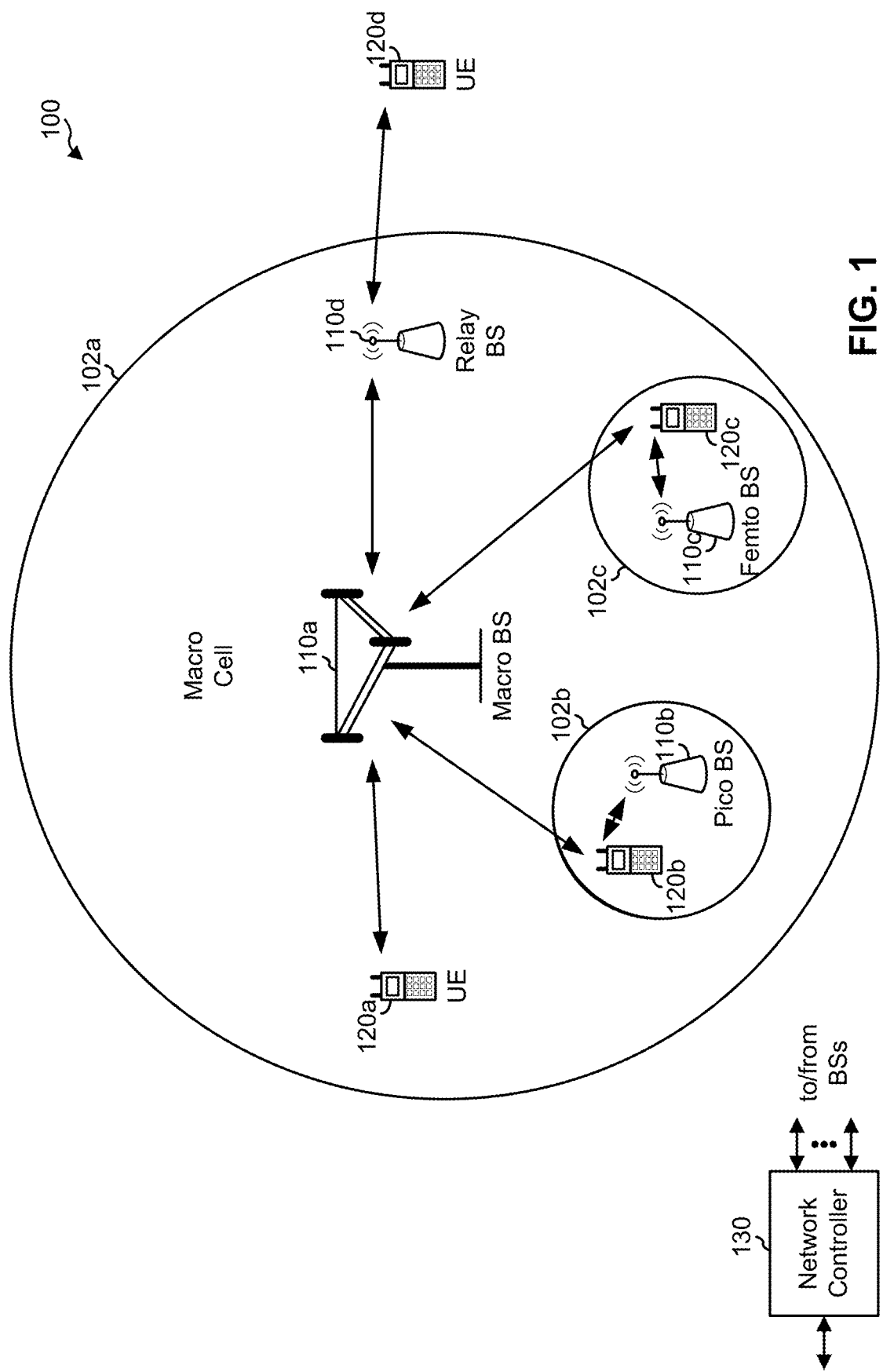
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a Node B, a gNB, a 5G NB, an access point, a transmit receive point (TRP), and/or the like. Each BS may provide communication coverage for a particular geographic area. In 3GPP, the term "cell" can refer to coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

UEs 120 and base stations 110 may communicate over an unlicensed radio frequency (RF) spectrum band using one or more radio access technologies, such as a Wi-Fi radio access technology, an LTE radio access technology, a 5G radio access technology, and/or the like. An unlicensed RF spectrum band may refer to an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. For example, devices that use the unlicensed RF spectrum band must typically accept any radio interference caused by other devices that use the unlicensed RF spectrum band. Because the unlicensed RF spectrum band may be shared by devices operating under different protocols (e.g., different RATs), transmitting devices may contend for access to the unlicensed RF spectrum band.

In some aspects, the unlicensed RF spectrum band may include one or more radio frequencies (e.g., one or more RF spectrum bands) included in the radio spectrum (e.g., the portion of the electromagnetic spectrum corresponding to radio frequencies, or frequencies lower than approximately 300 gigahertz (GHz)). In some aspects, the unlicensed RF spectrum band may include one or more RF spectrum bands that are open for shared use by any device that complies with regulatory agency rules (e.g., associated with a particular country) for communicating via the one or more RF spectrum bands. In some aspects, the unlicensed RF spectrum band may include one or more radio frequencies in the 2.4 GHz band. For example, the unlicensed RF spectrum band may include one or more radio frequencies between approximately 2.4 GHz and 2.48 GHz. Additionally, or alternatively, the unlicensed RF spectrum band may include one or more radio frequencies in the 5 GHz band. For example, the unlicensed RF spectrum band may include one or more radio frequencies between approximately 5.15 GHz and approximately 5.825 GHz.

The unlicensed RF spectrum band may be divided into channels via which RF communications may be transmitted. In some aspects, the unlicensed RF spectrum band may include one or more channels of approximately 1.4 MHz bandwidth (e.g., up to 59 channels at 1.4 MHz bandwidth in the 2.4 GHz band). Additionally, or alternatively, the unlicensed RF spectrum band may include one or more channels of approximately 20 MHz bandwidth. Wireless devices may communicate via a channel included in the unlicensed RF spectrum band. For example, a wireless device may communicate via an RF channel using a Wi-Fi radio access technology, an LTE radio access technology, a 5G radio access technology, and/or the like. In some aspects, a wireless device may contend for access to the unlicensed RF spectrum band before sending a transmission via the unlicensed RF spectrum band.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
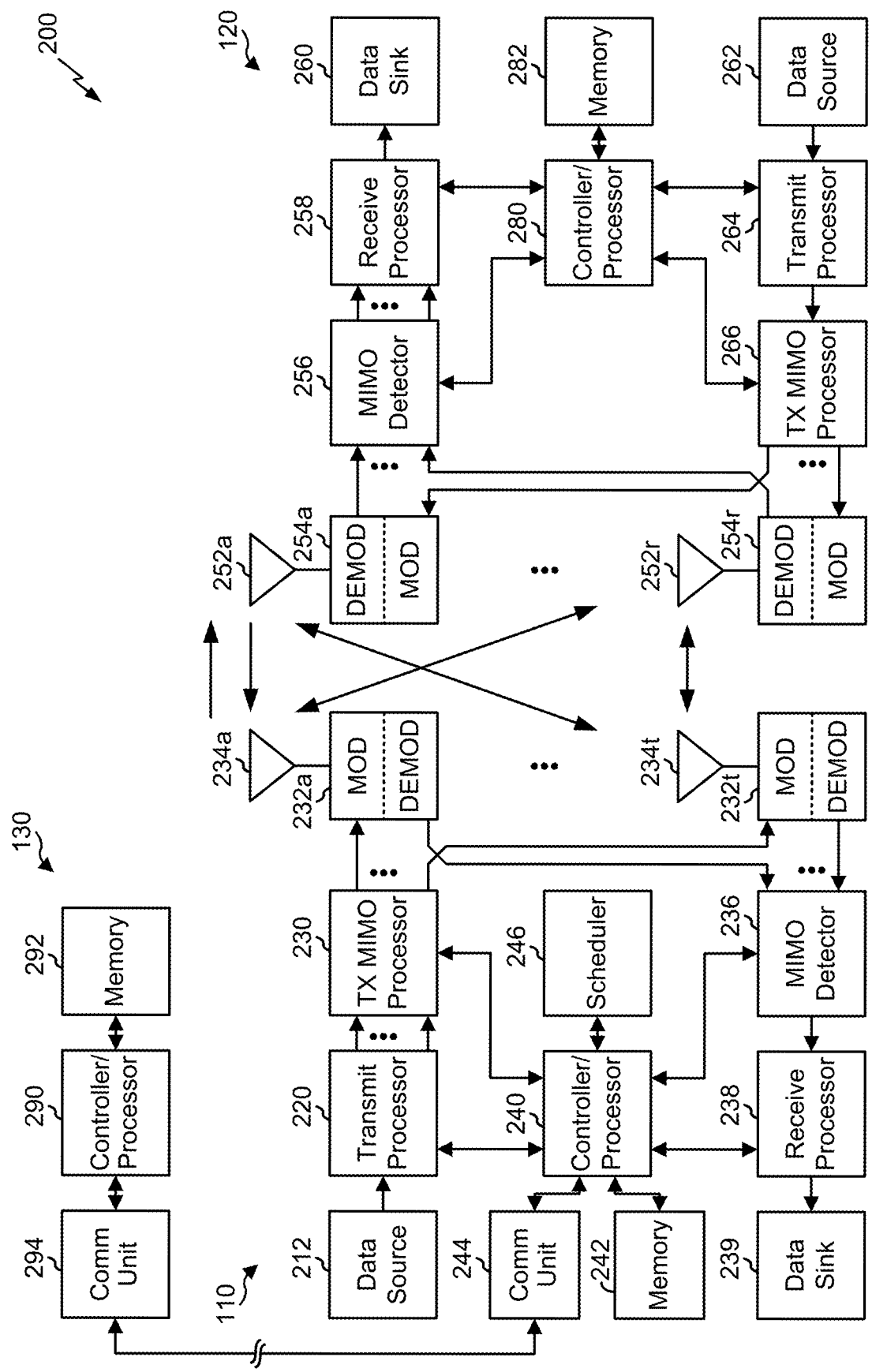
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to determine channels for frequency hopping in an unlicensed radio frequency spectrum band. For example, controller/processor 280 and/or other processors and modules at base station 110, may perform or direct operations of UE 120 to determine channels for frequency hopping in an unlicensed radio frequency spectrum band. For example, controller/processor 280 and/ or other controllers/processors and modules at BS 110 may perform or direct operations of, for example, method 700 of FIG. 7, method 800 of FIG. 8, and/or other processes as described herein. In some aspects, one or more of the components shown in FIG. 2 may be employed to perform example method 700 of FIG. 7, method 800 of FIG. 8, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
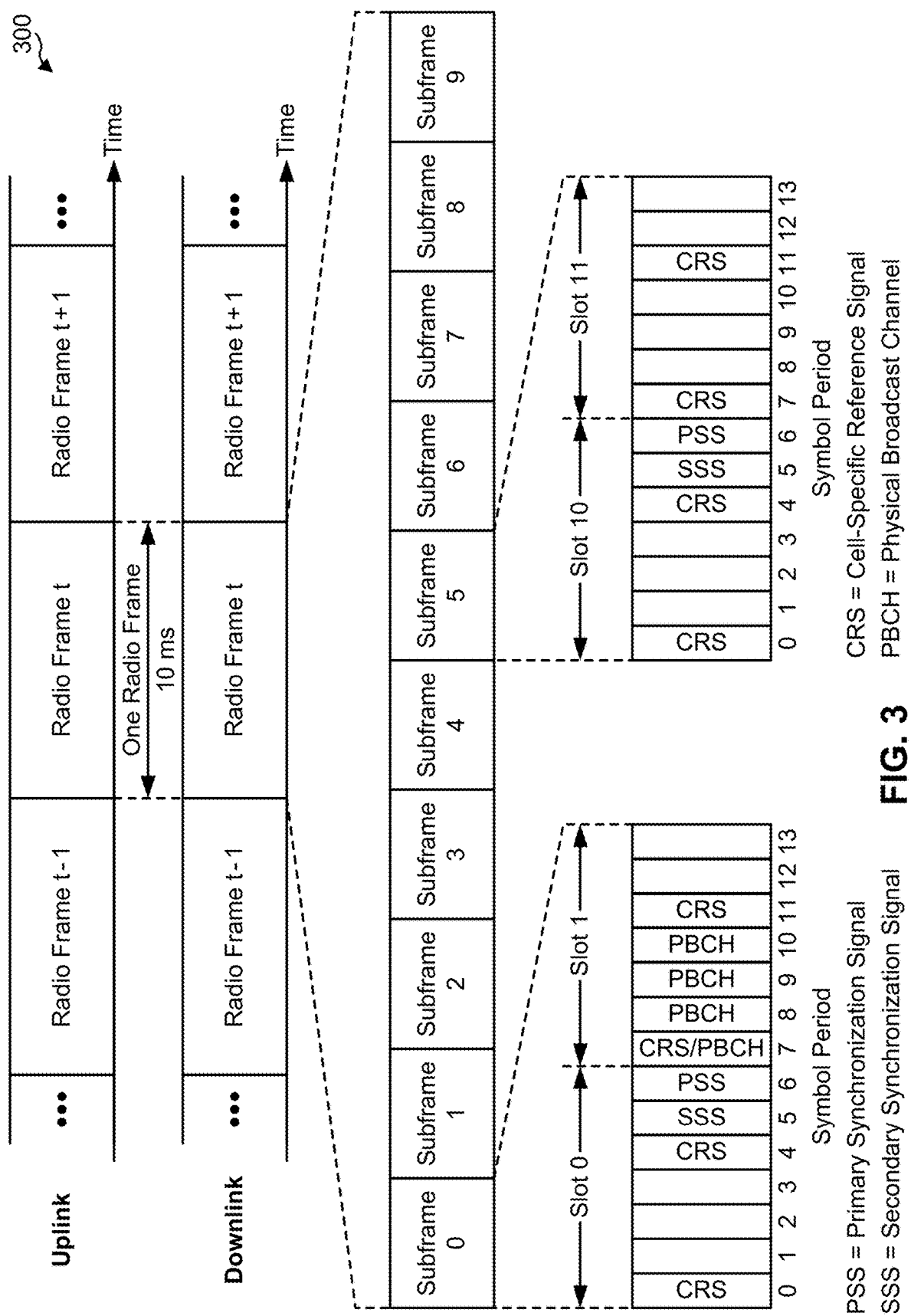
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as 5G systems), a Node B may transmit these or other signals in these locations or in different locations of the subframe. In some aspects, a base station may transmit one or more of the PSS, the SSS, a PBCH communication (e.g., a master information block), and/or the like on an anchor channel of an unlicensed RF spectrum band. The anchor channel may be used for initial synchronization (e.g., between UEs and base stations). In some aspects, the anchor channel may be fixed (e.g., may not change over time) to assist with such synchronization. Additionally, or alternatively, the unlicensed RF spectrum band may include multiple anchor channels.

As indicated above, FIG. 3 is provided merely as an example. Other examples are possible and may differ from what was described with regard to FIG. 3.

Figure 4:
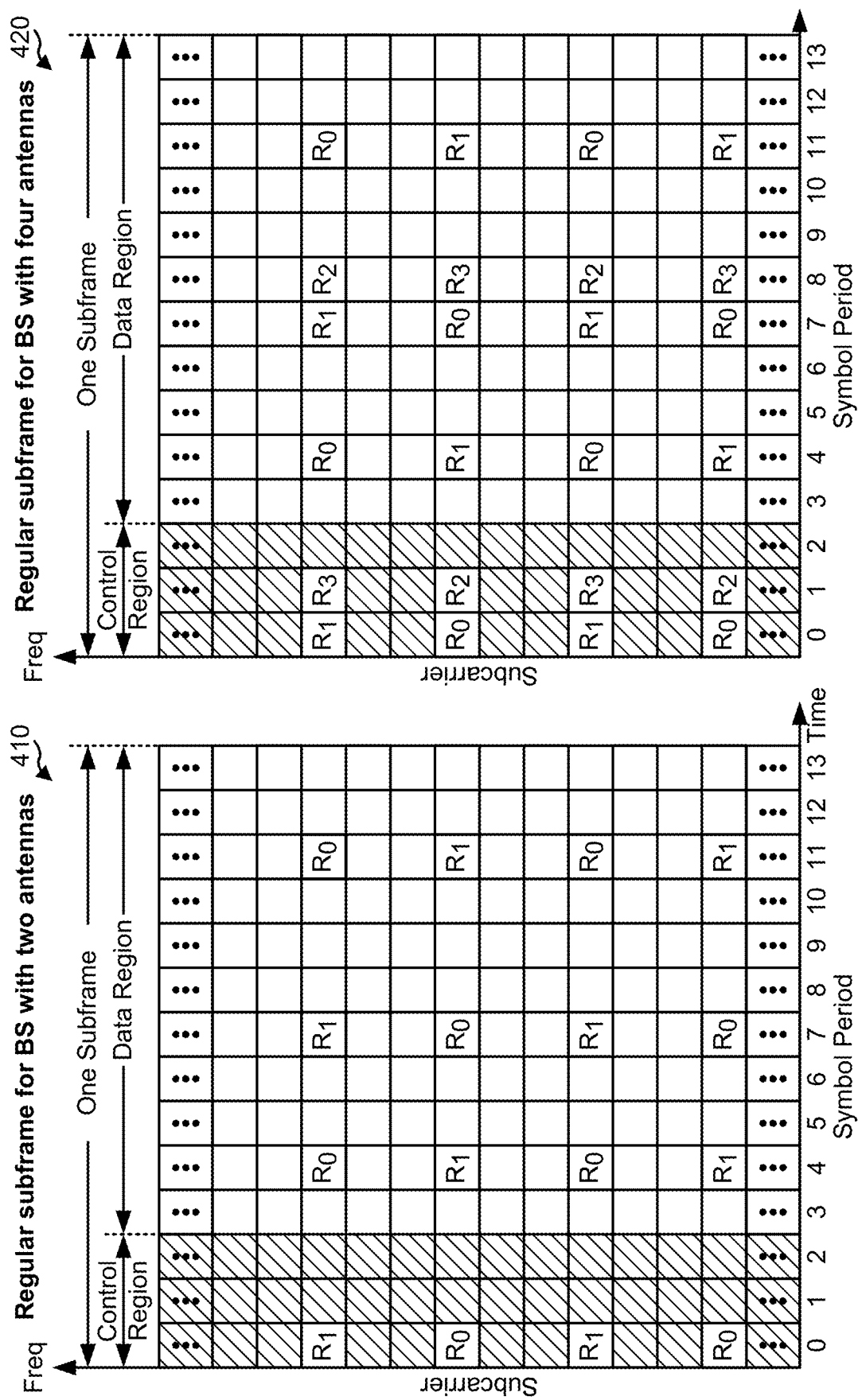
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available. In some aspects, one or more of these signals or channels may be transmitted on an anchor channel of an unlicensed RF spectrum band. Additionally, or alternatively, the anchor channel may be used to transmit pages, a positioning reference signal (PRS), and/or the like.

While aspects of the examples described herein may be associated with LTE technologies, aspects of the present disclosure may be applicable with other wireless communication systems, such as 5G technologies.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

As indicated above, FIG. 4 is provided merely as an example. Other examples are possible and may differ from what was described with regard to FIG. 4.

When communicating in an unlicensed radio frequency (RF) spectrum band, a UE may need to account for potential interference from other devices operating on the unlicensed RF spectrum band, and/or may need to operate to coexist or share the unlicensed RF spectrum band with other devices. One way to promote coexistence with other devices is to use a listen before talk procedure to measure channel conditions before communicating on a channel (e.g., to determine whether other devices are communicating on the channel or whether the channel is available for communications). In some cases, the listen before talk procedure may be combined with frequency hopping, where the UE hops among channels to increase the likelihood of finding a clear channel for communication. This frequency hopping may be performed according to a frequency hopping pattern that is known to both the UE and a base station with which the UE communicates, so that communications can be successfully received.

In some cases, a particular set of channels may have better channel conditions than other channels, and so may be better suited for communications between the UE and the base station. This set of channels may be communicated by the base station to the UE using a list, such as a whitelist of channels that the UE can use for frequency hopping, a blacklist of channels that the UE should not use for frequency hopping, or some combination of the two. This list of channels may change over time as channel conditions change. Thus, a UE may need to acquire the list of channels from the base station when the UE initially connects to the base station, and may need to reacquire the list of channels when the list of channels changes. Some techniques described herein assist with acquiring and/or reacquiring a dynamic list of channels to be used to communicate over the unlicensed RF spectrum band, thereby increasing communication reliability and promoting coexistence in the unlicensed RF spectrum band. Some techniques described herein also assist the UE in obtaining the list of channels with low latency (e.g., shortly after the list has changed) and with low power consumption.

Figure 5:
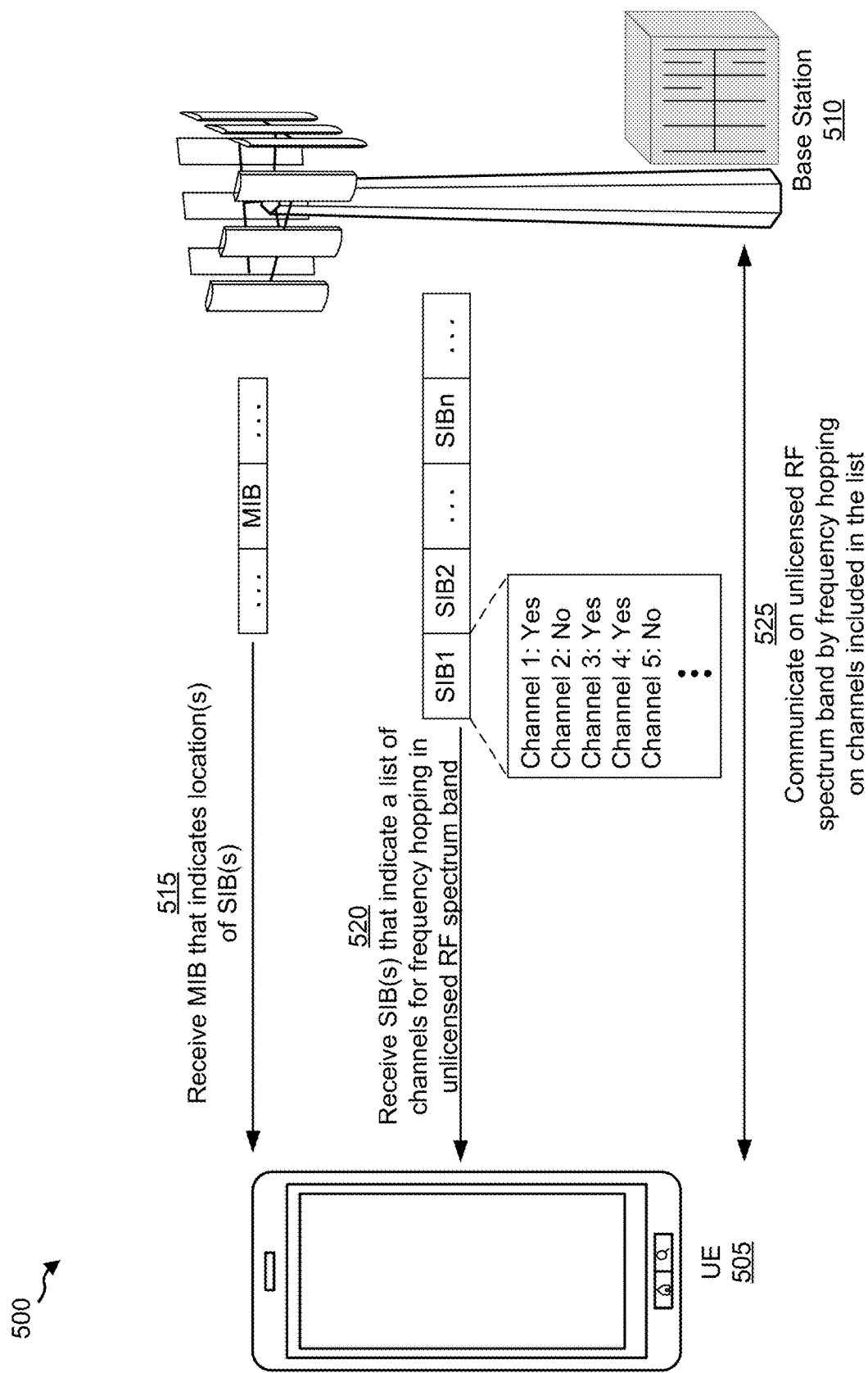
FIG. 5 is a diagram illustrating an example of determining channels for frequency hopping in an unlicensed radio frequency spectrum band.

FIG. 5 is a diagram illustrating an example 500 of determining channels for frequency hopping in an unlicensed radio frequency spectrum band.

As shown in FIG. 5, a UE 505 may communicate with a base station 510 (e.g., using an LTE radio access technology, a 5G radio access technology, and/or the like). In some aspects, the UE 505 may correspond to one or more UEs described elsewhere herein, such as the UE 120 of FIG. 1 and/or the like. Additionally, or alternatively, the base station 510 may correspond to one or more base stations described elsewhere herein, such as the base station 110 of FIG. 1 and/or the like.

At 515, the UE 505 may receive a master information block (MIB) that indicates one or more locations from which one or more corresponding system information blocks (SIBs) can be obtained. A location may include, for example, a time resource, a frequency resource, and/or the like. For example, the MIB may indicate a frame index and/or a channel index where one or more SIBs are transmitted (e.g., SIB1 and/or one or more other SIBs). In some aspects, the MIB may be broadcast by the base station 510 on a broadcast channel (e.g., PBCH), and may indicate system information, such as a system bandwidth, physical HARQ indicator channel (PHICH) information, a subframe number, and/or the like. In some aspects, the PBCH may be transmitted on an anchor channel of the unlicensed RF spectrum band. In some aspects, the MIB may be configured with a fixed number of bits, such as 24 bits and/or the like. Additionally, or alternatively, the MIB may be transmitted with a particular periodicity, such as 10 milliseconds, 40 milliseconds, and/or the like. The MIB may be used to determine one or more locations corresponding to one or more SIBs (e.g., SIB1, SIB2, SIB3, . . . , SIB17, and/or the like). For example, the MIB may include SIB scheduling information and/or physical layer information (e.g., a system bandwidth), which may be used to obtain one or more SIBs.

At 520, the UE 505 may receive one or more SIBs based at least in part on information in the MIB. The one or more SIBs may indicate a list of channels permitted to be used by the UE 505 for frequency hopping in an unlicensed RF spectrum band. In some aspects, the SIB(s) may be broadcast by the base station 510 on a downlink data channel (e.g., PDSCH), and may indicate system information. For example, the SIB(s) may include SIB1, which may include cell access information relevant to accessing a cell of the base station 510, scheduling information for other SIBs, and/or the like. In some aspects, SIB1 may be transmitted with a particular periodicity, such as 80 milliseconds and/or the like.

In some aspects, one or more SIBs may indicate a list of channels that the UE 505 is permitted to use for frequency hopping when communicating with the base station 510 on an unlicensed RF spectrum band. For example, the list of channels may include a whitelist of channels that the UE 505 can use for frequency hopping, a blacklist of channels that the UE 505 should not use for frequency hopping, or some combination thereof. In some aspects, the list of channels may be indicated in SIB1. Additionally, or alternatively, the list of channels may be indicated in another SIB, such as SIB2, SIB3, and/or the like. In some aspects, the list of channels may be cell-specific (e.g., may indicate different channels for different base stations). For example, the list of channels may be specific to a serving base station 510 to which the UE 505 is connected. Additionally, or alternatively, a number of channels used for frequency hopping in the unlicensed RF spectrum band may be cell-specific, and different base stations 510 may use a different number of channels (e.g., depending on conditions in the cell and/or conditions associated with the base station 510). In some aspects, the number of channels may be indicated to the UE 505 (e.g., in the MIB and/or one or more SIBs).

In some aspects, the list of channels may be indicated in the MIB. However, because the MIB may be a fixed size (e.g., 24 bits and/or the like), the MIB may not include enough bits to include the list for every channel in the unlicensed RF spectrum band (e.g., which may include 59 channels, 60 channels, and/or the like, which may require a bitmap of 59 bits, 60 bits, and/or the like). In this case, the list of channels may be indicated in one or more SIBs. Additionally, or alternatively, channels may be grouped, and a bit in the bitmap may provide a common indication for the group of channels (e.g., whether the multiple channels are permitted to be used for communicating in the unlicensed RF spectrum band).

At 525, the UE 505 may communicate with the base station 510 on the unlicensed RF spectrum band by frequency hopping on a plurality of channels included in the list of channels. In some aspects, the UE 505 may communicate by tuning to a first channel in the list and performing a listen before talk procedure to measure channel conditions (e.g., a signal energy and/or the like) before communicating on the first channel. The UE 505 may communicate on the first channel if channel conditions are good (e.g., the signal energy is less than or equal to a threshold), or may hop (e.g., tune) to a second channel in the list if channel conditions are poor (e.g., the signal energy is greater than or equal to a threshold). The UE 505 may measure channel conditions on the second channel, and may continue to operate in this manner, hopping among channels included in the list to communicate with the base station 510.

Additionally, or alternatively, the UE 505 may hop among channels in the list according to a hopping pattern indicated in the one or more SIBs, which may indicate an order in which the UE 505 is to hop among channels, a time period for communicating on a channel before hopping to another channel, and/or the like. In this way, the UE 505 may increase the likelihood of finding a clear channel for communication, and may promote coexistence with other devices communicating on the unlicensed RF spectrum band.

In some aspects, the UE 505 may receive the MIB and/or the one or more SIBs in association with an initial connection to a cell of the base station 510. For example, when the UE 505 connects to the cell for the first time, the UE 505 may obtain the MIB, which may indicate a location of one or more SIBs (e.g., SIB1 and/or the like), such as by indicating a current frame index and/or a current channel index where SIB1 and/or other SIBs are transmitted. In some aspects, the UE 505 may obtain SIB1, which may indicate the list of channels for frequency hopping, a hopping pattern (e.g., an order or sequence of channels to hop, a time period for hopping, and/or the like), and/or other parameters. Additionally, or alternatively, this information may be indicated in a different SIB, and SIB1 may indicate the location of the different SIB.

In some aspects, the UE 505 may receive the MIB and/or the one or more SIBs after an initial connection to a cell of the base station 510. In this case, the UE 505 may obtain the MIB and/or the one or more SIBs based at least in part on an indication that the list of channels has changed. Otherwise, if the list of channels has not changed, then the UE 505 may continue to use a previously obtained list for frequency hopping, and may conserve resources by not obtaining the unchanged list.

In some aspects (e.g., when performing a cell acquisition procedure when in a radio resource control (RRC) idle mode), the UE 505 may obtain and read a MIB (and/or one or more SIBs, such as SIB1) to determine whether the list of channels has changed. For example, the MIB or a SIB (e.g., SIB1) may indicate whether the list of channels has changed from a previously indicated list. If the list of channels has changed, then the UE 505 may obtain the new list of channels (e.g., from one or more SIBs) based at least in part on determining that the list of channels has changed. In this way, the UE 505 may maintain a current list of channels for frequency hopping when communicating with the base station 510 via the unlicensed RF spectrum band.

Additionally, or alternatively, the UE 505 may read a value from the MIB or the SIB, and may compare the value to a previously received value to determine whether the list of channels has changed from the previously indicated list. For example, each time that the base station 510 modifies the list of channels, the base station 510 may modify the value to indicate that the list has changed. If the UE 505 receives a value that matches the previously received value, then this may indicate that the list has not changed, and the UE 505 may continue to use the previous list. However, if the value does not match the previously received value, then this may indicate that the list has changed, and the UE 505 may obtain the new list. In some aspects, the value may be configured to be N bits in length, where N is configured to reduce a likelihood that the UE 505 reads a matching value when the list has changed. For example, N may be configured to be greater than or equal to 2, greater than or equal to 3, and/or the like.

Additionally, or alternatively, the UE 505 may receive a page triggered by a change to the list of channels, and may obtain the new list of channels (e.g., by reading the MIB and/or the SIB(s)) based at least in part on receiving the page. Such paging may be done using the MIB (e.g., a value to indicate whether the list has changed) and the SIB (e.g., to indicate the list of channels), as described above. In some aspects, such paging may be done on one or more fixed channels. Such fixed channel(s) may be used for communication in the unlicensed RF spectrum band, and may not change over time (e.g., may be excluded from the list of channels that changes over time). In some aspects, the fixed channel(s) may include an anchor channel that assists with initial synchronization of the UE 505. Additionally, or alternatively, the fixed channel(s) may include one or more channels other than the anchor channel. In some aspects, the combination of fixed channel(s) may be cell-specific (e.g., may be based at least in part on a physical cell identity).

By using fixed channels for paging, the UE 505 may conserve power that would otherwise be used by waking for an extended amount of time to receive both the MIB and the SIB to periodically read the whitelist (e.g., at every instance of transmission of the MIB and/or the SIB, or on multiple instances). However, using the MIB and the SIB may increase a likelihood of receiving the page when a load on the fixed channels is high. In some aspects, the MIB may indicate a combination of fixed channels (e.g., using one or more bits). For example, different bit values may correspond to different combinations of channel indices corresponding to the fixed channels (e.g., a first value may indicate that channels 1, 3, 5, and 7 are fixed channels, a second value may indicate that channels 2, 4, 6, and 8 are fixed channels, and/or the like). Additionally, or alternatively, a paging window for a plurality of fixed channels may be defined over a combination of discontinuous time intervals determined based at least in part on a frequency hopping pattern associated with the plurality of fixed channels. In this way, the channels used for paging are less likely to be overloaded. In some aspects, the fixed channel(s) may be used for transmission of pages, as described above. Additionally, or alternatively, the fixed channel(s) may be used for transmission of at least one SIB (e.g., of the one or more SIBs), transmission of one or more positioning signals (e.g., a positioning reference signal (PRS)), and/or the like. In this way, the list of channels can be indicated to the UE 505 via transmission of one or more SIBs and/or pages in one or more fixed channels.

In some aspects (e.g., when the list changes while the UE 505 is in RRC connected mode), the UE 505 may perform an RRC configuration procedure to obtain the MIB and/or the one or more SIBs. For example, the base station 510 may disconnect one or more connected UEs 505 that are configured to use the list (e.g., based at least in part on the class of the UE 505, an indication that the UE 505 communicates using the unlicensed RF spectrum band, and/or the like), and the base station 510 may modify the list. Upon reconnecting to the base station 510, the UE 505 may obtain the modified list (e.g., using a MIB and/or one or more SIBs) during an RRC configuration procedure.

Additionally, or alternatively, the UE 505 may receive an indication from the base station 510 that the list of channels has changed or will change (e.g., after a particular time period), and the UE 505 may obtain the list of channels based at least in part on this indication. In some aspects, the indication may be received in a control channel, such as the PDCCH, a common PDCCH (CPDCCH), and/or the like. In some aspects, the indication may indicate a timing associated with the change (e.g., when the list changed, when the list will change, when a new list is to be used, and/or the like). Additionally, or alternatively, the timing may be indicated in the one or more SIBs. The UE 505 may use this information to determine when different lists are to be used.

Additionally, or alternatively, the UE 505 may obtain the list of channels based at least in part on expiration of a modification period associated with the list of channels. For example, the UE 505 may periodically obtain the list of channels when a modification period expires (e.g., every 100 milliseconds, every 100 seconds, every 30 minutes, every hour, and/or the like). Additionally, or alternatively, the UE 505 may periodically read the MIB and/or the one or more SIBs for an indication of whether the list has changed, and may obtain the new list if the list has changed. In this way, the UE 505 may obtain an accurate list of channels to be used for frequency hopping in the unlicensed RF spectrum band. Additional details regarding modifying the list of channels are described below in connection with FIG. 6.

As indicated above, FIG. 5 is provided merely as an example. Other examples are possible and may differ from what was described with regard to FIG. 5.

Figure 6:
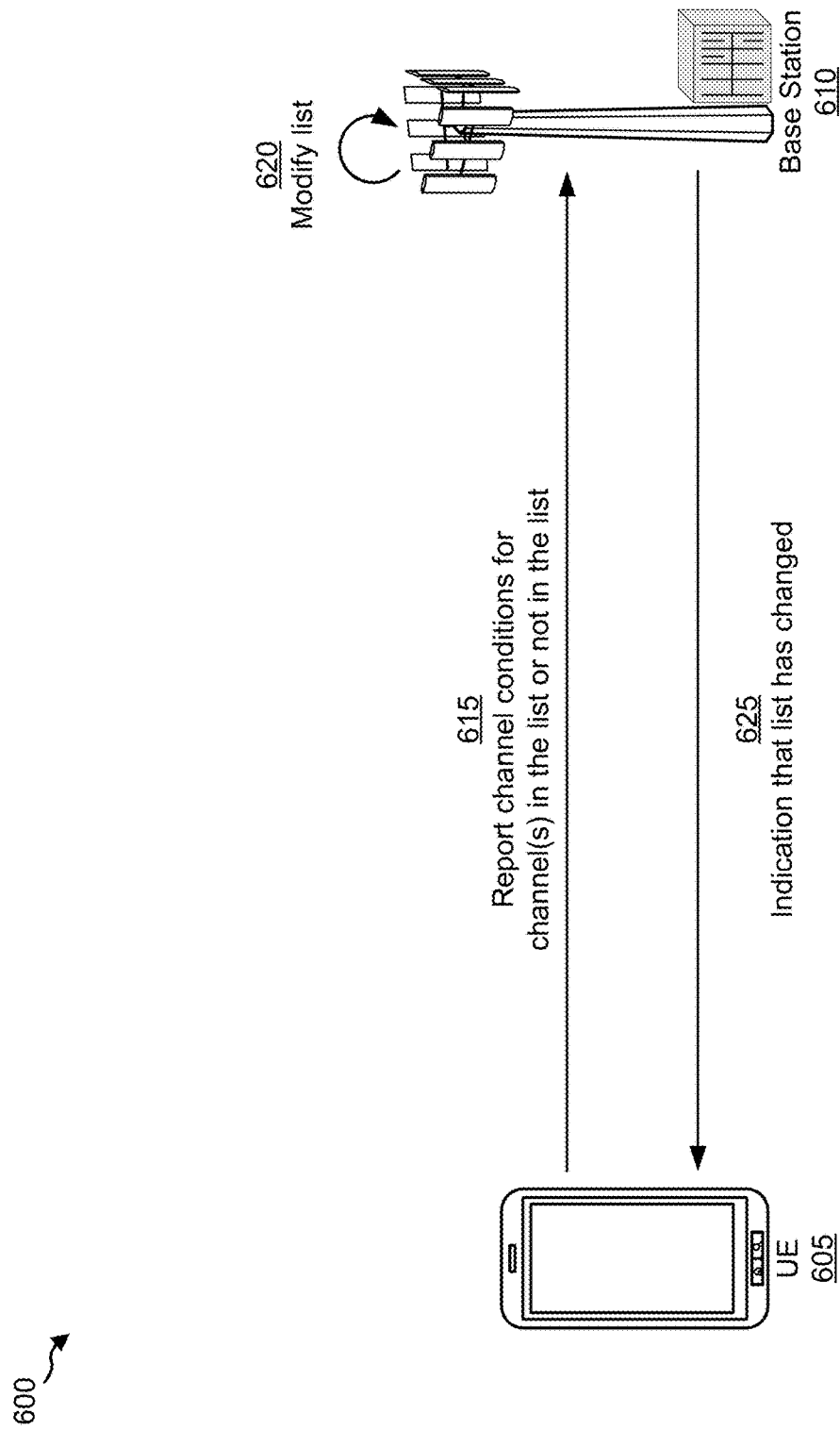
FIG. 6 is a diagram illustrating another example of determining channels for frequency hopping in an unlicensed radio frequency spectrum band.

FIG. 6 is a diagram illustrating an example 600 of determining channels for frequency hopping in an unlicensed radio frequency spectrum band.

As shown in FIG. 6, a UE 605 may communicate with a base station 610 (e.g., using an LTE radio access technology, a 5G radio access technology, and/or the like). In some aspects, the UE 605 may correspond to one or more UEs described elsewhere herein, such as the UE 120 of FIG. 1, the UE 505 of FIG. 5, and/or the like. Additionally, or alternatively, the base station 610 may correspond to one or more base stations described elsewhere herein, such as the base station 110 of FIG. 1, the base station 510 of FIG. 5, and/or the like.

At 615, the UE 605 may report a channel condition to the base station 610. In some aspects, the UE 605 may report a channel condition for at least one channel included in the list of channels received by the UE 605 (e.g., one or more whitelisted channels), as described above in connection with FIG. 5. Additionally, or alternatively, the UE 605 may report a channel condition for one or more channels not included in the list (e.g., one or more blacklisted channels). In some aspects, such reporting may trigger a change in the list of channels, as described below. In some aspects, the UE 605 may report a channel parameter, such as a reference signal received power (RSRP) parameter, a reference signal received quality (RSRQ) parameter, a received signal strength indicator (RSSI) parameter, and/or the like.

In some aspects, for channels not included in the list (e.g., blacklisted channels), the base station 610 may periodically transmit on the blacklisted channels so that the UE 605 can report channel parameters associated with the blacklisted channels. In some aspects, the base station 610 may instruct the UE 605 to measure one or more channel parameters on one or more blacklisted channels and to report measurements for the one or more blacklisted channels.

Additionally, or alternatively, the base station 610 may configure reporting modes for channels included in the list (e.g., whitelisted channels). For example, the base station 610 may configure frequency-specific reporting for the UE 605 to report channel conditions of particular channels (e.g., whitelisted channels and/or blacklisted channels). In a first reporting mode, the UE 605 may periodically send reports for all of the channels included in the list of channels. In a second reporting mode, the UE 605 may send a report for a channel only if channel conditions are poor for the channel (e.g., if one or more channel parameters fail to satisfy one or more thresholds, which may be indicated to the UE 605 by the base station 610). In a third reporting mode, the UE 605 may send a report (e.g., for multiple channels) if a threshold number or percentage of channels, included in the list, are associated with poor channel conditions. These different reporting modes provide tradeoffs between updating the list quickly when channel conditions are poor versus conserving network resources by reporting less frequently.

At 620, the base station 610 may modify the list of channels. In some aspects, the base station 610 may receive a report associated with one or more channels included in the list and/or one or more channels not included in the list, and may modify the list based at least in part on the report. Additionally, or alternatively, the base station 610 may measure a channel condition of one or more channels included in the list and/or one or more channels not included in the list, and may modify the list based at least in part on the measurement.

For example, the base station 610 may measure a channel to determine a channel parameter associated with the channel, such as a signal strength parameter (e.g., an RSSI value), a signal quality parameter, and/or the like. The base station 610 may determine whether to modify the list based at least in part on the channel parameter(s). For example, the base station 610 may remove a channel from the list when a channel parameter (e.g., an RSSI value) does not satisfy a threshold (e.g., is less than or equal to a threshold), and/or may add a channel to the list when the channel parameter satisfies a threshold (e.g., is greater than or equal to a threshold). In this way, the channels with the best conditions may be used for communicating in the unlicensed RF spectrum band, and the list may be updated to indicate the channels with the best conditions.

Similarly, the base station 610 may add a channel to the list and/or remove a channel from the list based at least in part on comparing one or more channel parameters, received in a report from the UE 605, to one or more thresholds. In some aspects, the base station 610 may modify the list based at least in part on a threshold number of UEs 605 reporting channel parameters that satisfy a threshold. For example, the base station 610 may add a blacklisted channel to the list of channels if a threshold number of UEs 605 indicate that the blacklisted channel has good quality. Similarly, the base station 610 may remove a whitelisted channel from the list of channels if a threshold number of UEs 605 indicate that the whitelisted channel has poor quality.

In some aspects, the base station 610 may modify the list by adding a channel (e.g., a blacklisted channel) to the list. Additionally, or alternatively, the base station 610 may modify the list by removing a channel (e.g., a whitelisted channel) from the list. In some aspects, the number of channels included in the list is not fixed. In this case, the base station 610 may add a channel to the list without removing another channel from the list, and/or may remove a channel from the list without adding another channel to the list. Additionally, or alternatively, the base station 610 may add and/or remove any number of channels at the same time (e.g., in between transmission of consecutive lists). In this case, when indicating the list of channels, the base station 610 may indicate the full list of channels so that the UE 605 can be updated with multiple possible modifications to the list.

In some aspects, a number of channels included in the list is fixed. In this case, the base station 610 may add a first channel to the list only when removing a second channel from the list (e.g., when channel conditions of the first channel are better than channel conditions of the second channel). In some aspects, the base station 610 may indicate the change to the list (e.g., by indicating a first channel index of the added channel and a second channel index of the removed channel). For example, the base station 610 may indicate the change in the MIB. In this way, the UE 605 may need to read only the MIB to update the list stored by the UE 605, rather than reading a SIB to obtain the full list. In some aspects, the base station 610 may indicate changes to the list in the MIB, and may also transmit the full list in a SIB. In this way, if the UE 605 misses an update in a MIB, then the UE 605 can still obtain the full list by reading the SIB.

At 625, the base station 610 may transmit an indication that the list of channels has changed, as described in more detail above in connection with FIG. 5. For example, the base station 610 may transmit the indication using a MIB (e.g., using a value that indicates whether the list has changed), one or more SIBs, a page, a downlink data channel, and/or the like. The UE 605 may acquire the modified list based at least in part on receiving the indication that the list of channels has changed. In this way, the base station 610 may keep the UE 605 updated on the list of channels to be used for frequency hopping in the unlicensed RF spectrum band.

In some aspects, the base station 610 (e.g., a serving base station for the UE 605) may transmit one or more neighbor lists of channels corresponding to one or more neighbor base stations. A neighbor list of channels for a neighbor base station may indicate the channels to be used for frequency hopping on the neighbor base station when communicating with the neighbor base station on the unlicensed RF spectrum band. In some aspects, the base station 610 may indicate a neighbor list to the UE 605. In this case, two base stations that are neighbors to one another may exchange lists, and may indicate to one another when a list has changed so that a new list may be obtained. Furthermore, when a serving base station 610 obtains a neighbor list or a new neighbor list from a neighbor base station, the serving base station 610 may provide the neighbor list to the UE 605. In this way, the UE 605 may store an updated neighbor list, which may be used for positioning, during handover, and/or the like.

As indicated above, FIG. 6 is provided merely as an example. Other examples are possible and may differ from what was described with regard to FIG. 6.

Figure 7:
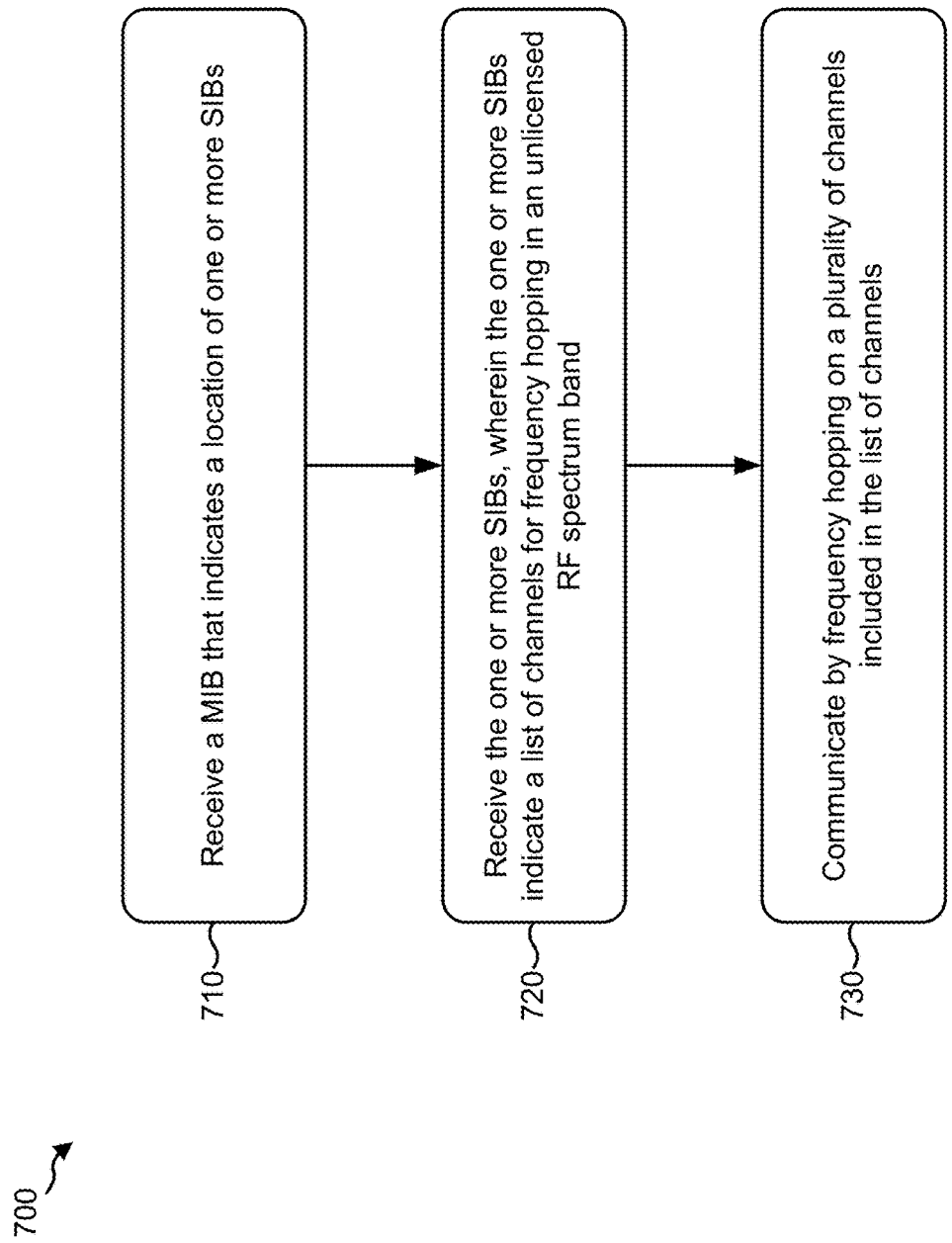
FIG. 7 is a flow chart of a method of wireless communication.

FIG. 7 is a flow chart of a method 700 of wireless communication. The method 700 may be performed by a UE (e.g., the UE 120 of FIG. 1, the UE 505 of FIG. 5, the UE 605 of FIG. 6, the apparatus 902/902', and/or the like).

At 710, the UE may receive a MIB that indicates a location of one or more SIBs. For example, the UE may receive a MIB, which may indicate one or more locations corresponding to one or more SIBs, as described above in connection with FIGS. 5 and 6.

At 720, the UE may receive the one or more SIBs. For example, the UE may receive the one or more SIBs based at least in part on the MIB. As described above in connection with FIGS. 5 and 6, the one or more SIBs may indicate a list of channels for frequency hopping in an unlicensed RF spectrum band.

At 730, the UE may communicate by frequency hopping on a plurality of channels included in the list of channels. For example, the UE may communicate by frequency hopping on a plurality of channels included in the list, as described above in connection with FIGS. 5 and 6.

Method 700 may include additional aspects, such as any single aspect or any combination of aspects described below and/or in connection with one or more other processes described elsewhere herein.

In some aspects, the MIB or the one or more SIBs are obtained based at least in part on receiving a page triggered by a change to the list of channels. In some aspects, the MIB or a SIB, of the one or more SIBs, indicates whether the list of channels has changed from a previously indicated list. In some aspects, the list of channels is obtained based at least in part on determining that the list of channels has changed from the previously indicated list. In some aspects, the UE reads a value from the MIB or the SIB and compares the value to a previously received value to determine whether the list of channels has changed from the previously indicated list.

In some aspects, the list of channels corresponds to a base station serving the UE. In some aspects, the list of channels is associated with a neighbor base station. In some aspects, the list of channels changes over time (e.g., periodically). In some aspects, the MIB or the one or more SIBs indicate one or more fixed channels, for communication in the unlicensed radio frequency spectrum band, that do not change over time (e.g., that are semi-static or permanent). In some aspects, the one or more fixed channels are used for at least one of: transmission of at least one SIB of the one or more SIBs, transmission of one or more pages, one or more positioning signals, or some combination thereof. In some aspects, the MIB or the one or more SIBs include a value that corresponds to a combination of fixed channels to be used for communication in the unlicensed radio frequency spectrum band. In some aspects, the MIB or the one or more SIBs indicate a number of channels for frequency hopping in the unlicensed radio frequency spectrum band. In some aspects, the number of channels is cell-specific.

In some aspects, the MIB or the one or more SIBs are obtained based at least in part on: performing a radio resource control (RRC) configuration procedure, receiving an indication, in a common physical downlink control channel, that the list of channels has changed or will change, expiration of a modification period associated with the list of channels, or some combination thereof. In some aspects, the UE may search for one or more pages on a plurality of fixed channels using a paging window defined over a combination of discontinuous time intervals determined based at least in part on a frequency hopping pattern associated with the plurality of fixed channels.

In some aspects, the UE reports a channel condition for at least one of: at least one channel included in the list of channels permitted to be used by the UE for frequency hopping in the unlicensed radio frequency spectrum band, one or more channels not included in the list, or some combination thereof. In some aspects, reporting the channel condition triggers a change in the list of channels.

Although FIG. 7 shows example blocks of a method 700 of wireless communication, in some aspects, the method 700 may include additional blocks, fewer blocks, different blocks, or differently arranged blocks than those shown in FIG. 7. Additionally, or alternatively, two or more blocks shown in FIG. 7 may be performed in parallel.

Figure 8:
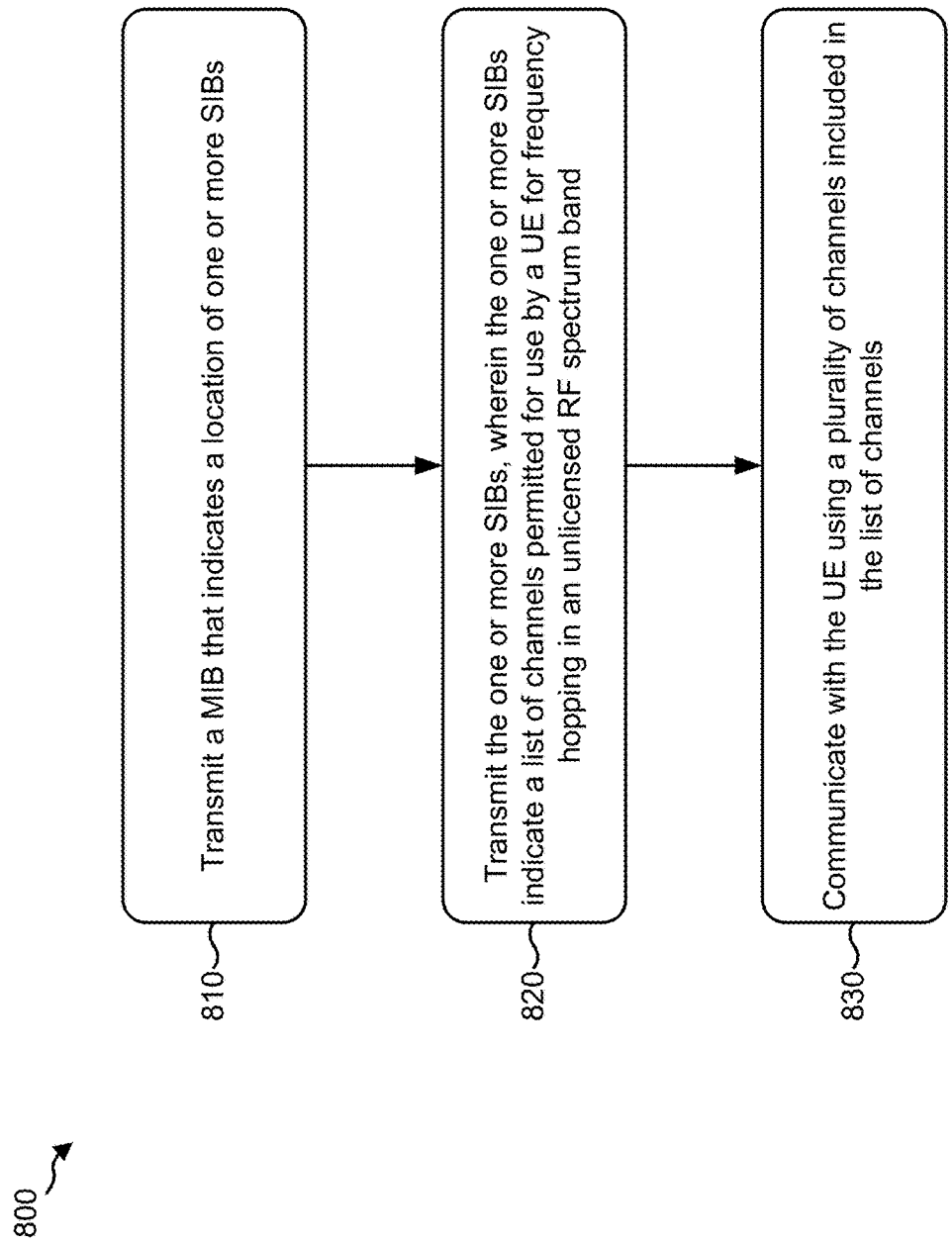
FIG. 8 is a flow chart of another method of wireless communication.

FIG. 8 is a flow chart of a method 800 of wireless communication. The method 800 may be performed by a base station (e.g., the base station 110 of FIG. 1, the base station 510 of FIG. 5, the base station 610 of FIG. 6, the apparatus 1102/1102', and/or the like).

At 810, the base station may transmit a MIB that indicates a location of one or more SIBs. For example, the base station may transmit a MIB, which may indicate one or more locations corresponding to one or more SIBs, as described above in connection with FIGS. 5 and 6.

At 820, the base station may transmit the one or more SIBs. For example, the base station may transmit the one or more SIBs based at least in part on the MIB. As described above in connection with FIGS. 5 and 6, the one or more SIBs may indicate a list of channels permitted for use by a UE for frequency hopping in an unlicensed RF spectrum band.

At 830, the base station may communicate with the UE using a plurality of channels included in the list of channels. For example, the base station may communicate with the UE by frequency hopping on a plurality of channels included in the list, as described above in connection with FIGS. 5 and 6.

Method 800 may include additional aspects, such as any single aspect or any combination of aspects described below and/or in connection with one or more other processes described elsewhere herein.

In some aspects, an indication that the list of channels has changed is transmitted (e.g., by the base station) based at least in part on a determination that the list of channels has changed. In some aspects, an indication of the list of channels is transmitted based at least in part on a change to the list of channels. In some aspects, the list of channels corresponds to the base station and is indicated to one or more neighbor base stations. In some aspects, the base station may modify the list of channels based at least in part on: one or more measurements or reports associated with one or more channels included in the list of channels, one or more measurements or reports associated with one or more channels not included in the list of channels, or some combination thereof. In some aspects, the base station may modify the list of channels by adding to the list, removing from the list, or adding and removing from the list. In some aspects, a number of channels, included in the list of channels, is fixed and a first channel is added to the list of channels when a second channel is removed from the list of channels.

Although FIG. 8 shows example blocks of a method 800 of wireless communication, in some aspects, the method 800 may include additional blocks, fewer blocks, different blocks, or differently arranged blocks than those shown in FIG. 8. Additionally, or alternatively, two or more blocks shown in FIG. 8 may be performed in parallel.

Figure 9:
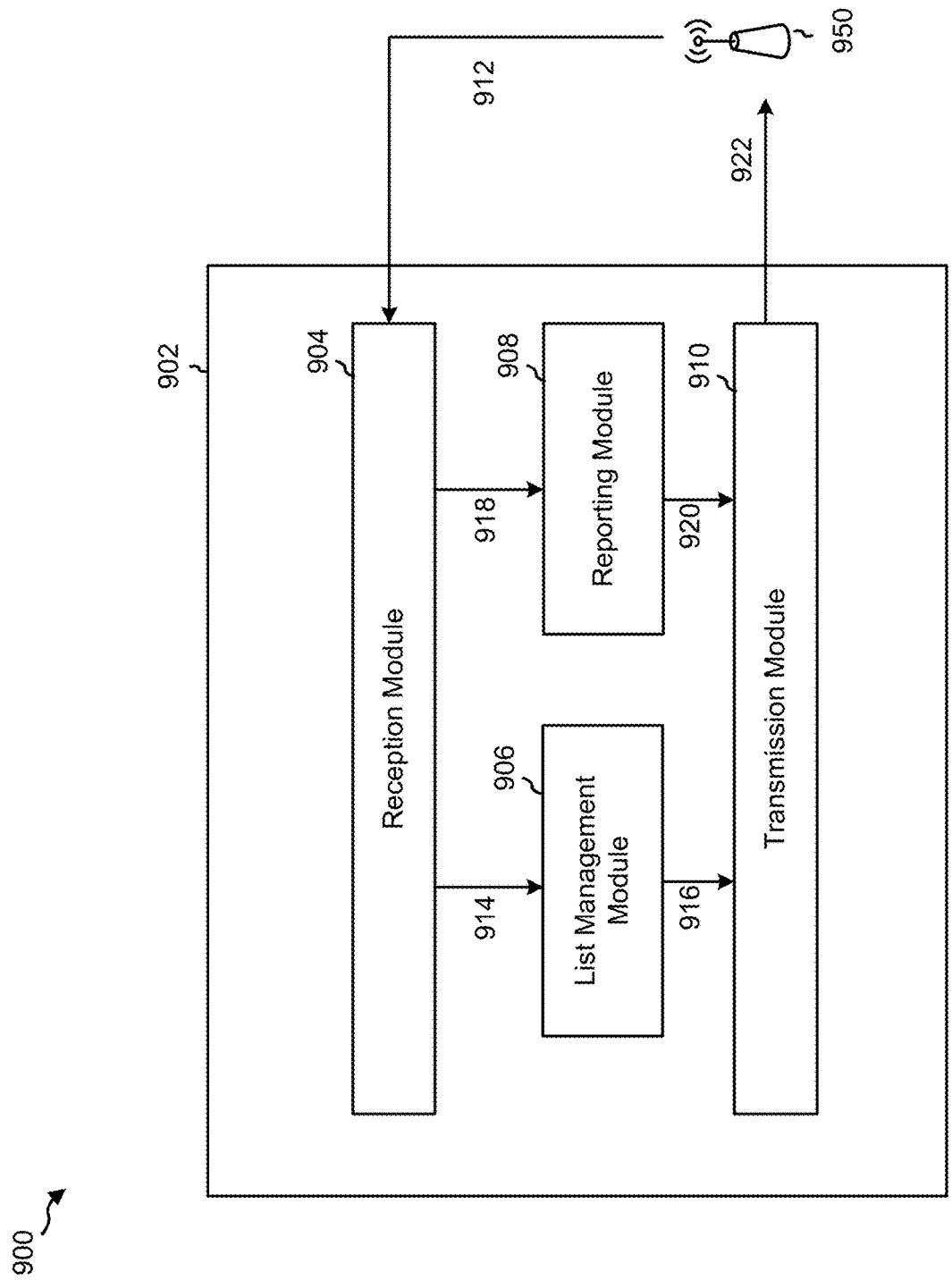
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be a UE, such as one or more UEs described elsewhere herein. In some aspects, the apparatus 902 includes a reception module 904, a list management module 906, a reporting module 908, and/or a transmission module 910.

The reception module 904 may receive data 912 from a base station 950. In some aspects, the data 912 may include a MIB, one or more SIBs, an indication of a list of channels to be used for frequency hopping in the unlicensed RF spectrum, and/or the like. The reception module 904 may provide the list to the list management module 906 as data 914. The list management module 906 may store the list, update the list when a new list is received, manage use of the list, and/or the like. In some aspects, the list management module 906 may indicate channels to be used for frequency hopping to the transmission module 910 as data 916. The transmission module 910 may transmit information to the base station 950, as data 922, by frequency hopping on the channels indicated by the list management module 906.

In some aspects, the data 912 may indicate a change to the list, and the reception module 904 may indicate the change to the list management module 906 as data 914. The list management module 906 may update a stored list, may indicate the new channels to the transmission module 910 as data 916, and/or the like.

In some aspects, the reception module 904 may measure one or more signals received on one or more channels as data 912. The reception module 904 may provide the signals to the reporting module 908 as data 918. The reporting module 908 may determine one or more channel parameters using the signals, and may provide the channel parameters to the transmission module 910 as data 920. The transmission module 910 may report the channel parameters to the base station 950 as data 922. The base station 950 may modify the list of channels based at least in part on the report.

The apparatus may include additional modules that perform each of the blocks of the algorithm in the aforementioned flow chart of FIG. 7. As such, each block in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
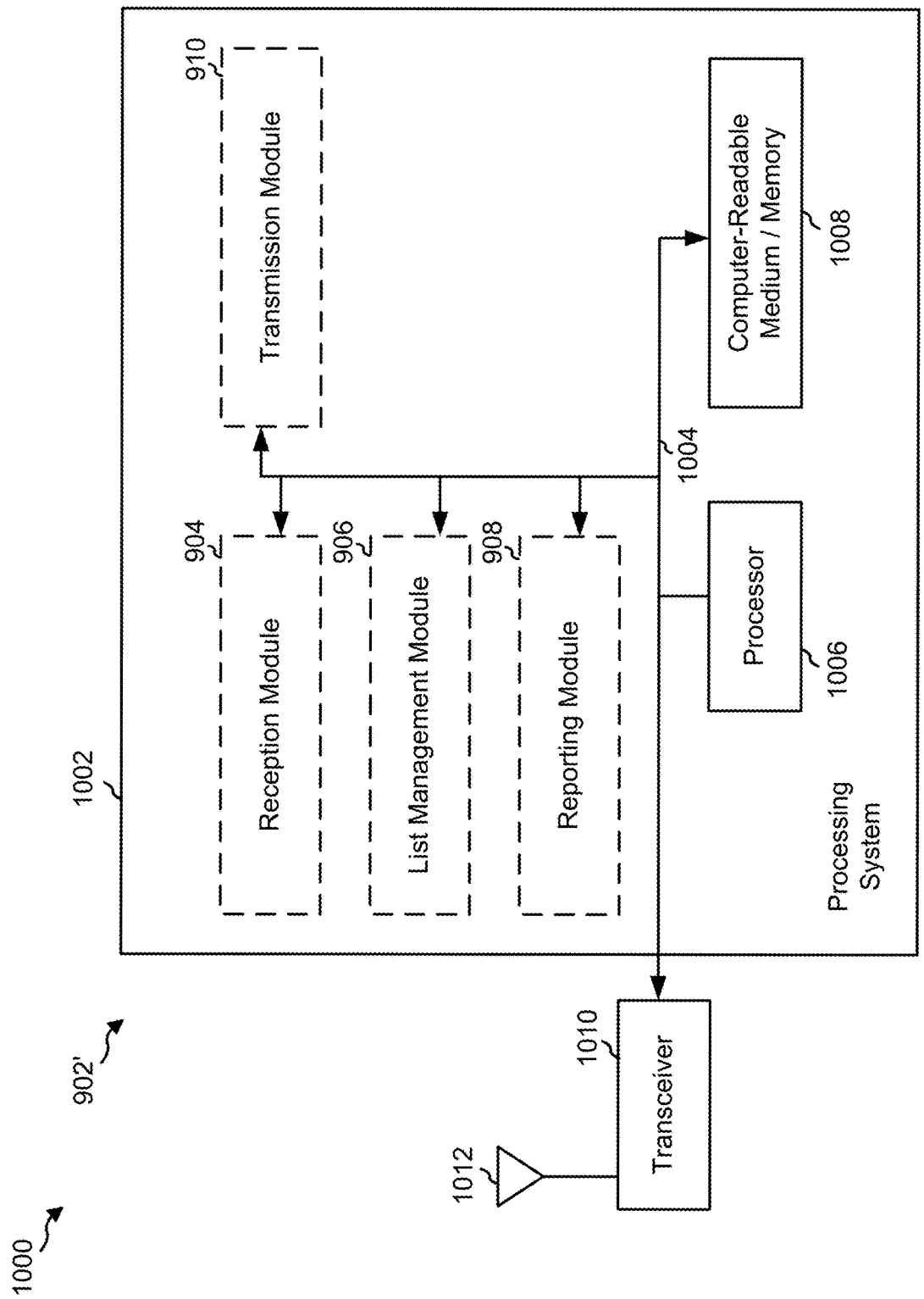
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE, such as one or more UEs described elsewhere herein.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, and/or 910, and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 910, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system further includes at least one of the modules 904, 906, 908, and/or 910. The modules may be software modules running in the processor 1006, resident/stored in the computer readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for receiving a MIB, means for receiving one or more SIBs, means for communicating by frequency hopping on a plurality of channels, means for reporting a channel condition, and/or the like. The aforementioned means may be one or more of the aforementioned modules of the apparatus 902 and/or the processing system 1002 of the apparatus 902' configured to perform the functions recited by the aforementioned means. As described supra, the processing system 1002 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 10 is provided as an example. Other examples are possible and may differ from what was described in connection with FIG. 10.

Figure 11:
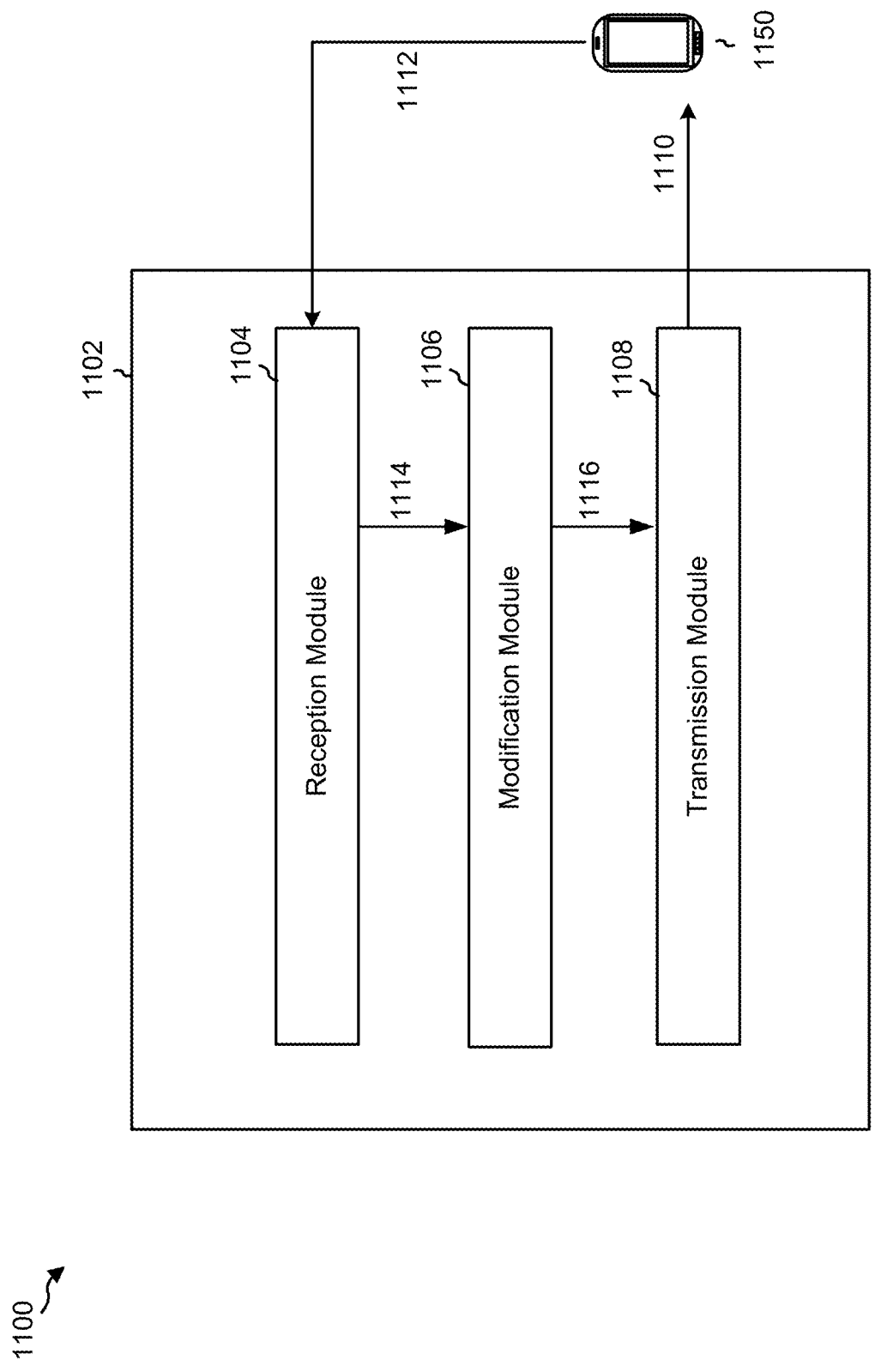
FIG. 11 is a conceptual data flow diagram illustrating the data flow between different modules/means/components in another example apparatus.

FIG. 11 is a conceptual data flow diagram 1100 illustrating the data flow between different modules/means/components in an example apparatus 1102. The apparatus 1102 may be a base station, such as one or more base stations described elsewhere herein. In some aspects, the apparatus 1102 includes a reception module 1104, a modification module 1106, and/or a transmission module 1108.

The transmission module 1108 may transmit, as data 1110, a MIB, one or more SIBs, an indication of a list of channels to be used for frequency hopping in the unlicensed RF spectrum, and/or the like. For example, the transmission module 1108 may transmit such data 1110 to a UE 1150. The reception module 1104 may receive one or more communications from the UE 1150 as data 1112. For example, the reception module 1104 may communicate with the UE 1150 using a plurality of channels included in the list of channels.

In some aspects, the reception module 1104 may receive one or more reports from the UE 1150, and may provide the one or more reports to the modification module 1106 as data 1114. The modification module 1106 may modify the list of channels based at least in part on the one or more reports and/or one or more measurements taken by the apparatus 1102 (e.g., via the reception module 1104), and may indicate the modified list of channels to the transmission module 1108 as data 1116. The transmission module 1108 may transmit an indication of the modified list to the UE 1150 as data 1110.

The apparatus may include additional modules that perform each of the blocks of the algorithm in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
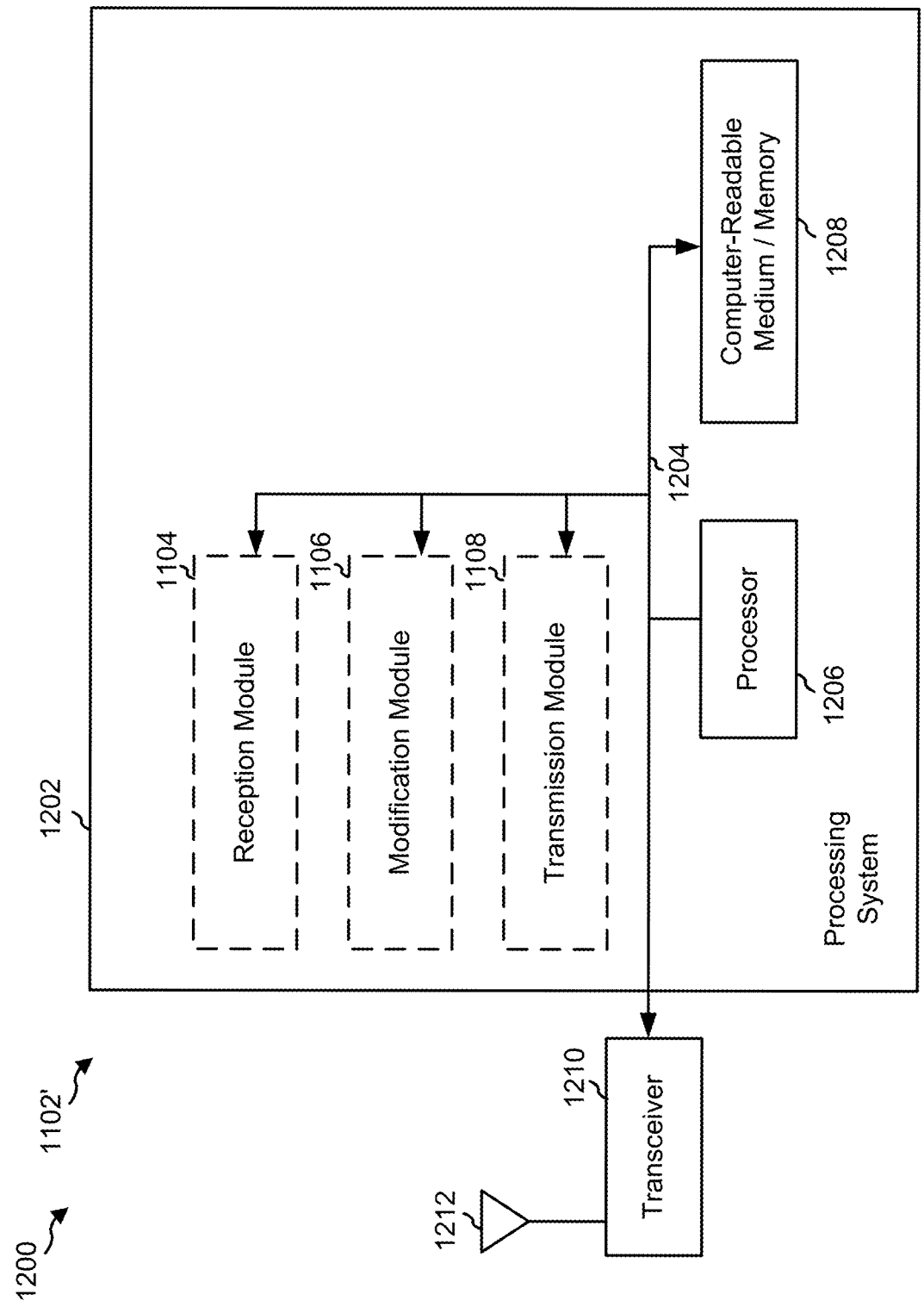
FIG. 12 is a diagram illustrating another example of a hardware implementation for an apparatus employing a processing system.

FIG. 12 is a diagram 1200 illustrating an example of a hardware implementation for an apparatus 1102' employing a processing system 1202. The apparatus 1102' may be a base station, such as one or more base stations described elsewhere herein.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, and/or 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, and/or 1108. The modules may be software modules running in the processor 1206, resident/stored in the computer readable medium/memory 1208, one or more hardware modules coupled to the processor 1206, or some combination thereof. The processing system 1202 may be a component of the base station 110 and may include the memory 242 and/or at least one of the TX MIMO processor 230, the RX processor 238, and/or the controller/processor 240.

In some aspects, the apparatus 1102/1102' for wireless communication includes means for transmitting a MIB, means for transmitting one or more SIBs, means for communicating with a UE using a plurality of channels included in a list of channels, means for transmitting an indication that the list of channels has changed, means for modifying the list of channels, and/or the like. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 12 is provided as an example. Other examples are possible and may differ from what was described in connection with FIG. 12.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a user equipment (UE), a master information block (MIB) that indicates a location of one or more system information blocks (SIBs),
      wherein the MIB includes a value that indicates whether a list of channels for frequency hopping in an unlicensed radio frequency spectrum band has changed from a previously indicated list;
   receiving, by the UE, the one or more SIBs based at least in part on the MIB, wherein the one or more SIBs indicate the list of channels,
      the list of channels being indicated by at least one of:
         a whitelist of channels that can be used for frequency hopping, or
         a blacklist of channels that cannot be used for frequency hopping; and
   communicating, by the UE, by frequency hopping on a plurality of channels, included in the list of channels, according to a frequency hopping pattern based at least in part on the indication in the one or more SIBs.

2. The method of claim 1, wherein the MIB or the one or more SIBs are obtained based at least in part on receiving a page triggered by a change to the list of channels.

3. The method of claim 1, wherein the list of channels is obtained based at least in part on determining that the list of channels has changed from the previously indicated list.

4. The method of claim 1, wherein the UE reads the value from the MIB and compares the value to a previously received value to determine whether the list of channels has changed from the previously indicated list.

5. The method of claim 1, wherein the list of channels corresponds to a base station serving the UE.

6. The method of claim 1, wherein the list of channels is associated with a neighbor base station.

7. The method of claim 1, wherein the MIB or the one or more SIBs indicate one or more fixed channels, for communication in the unlicensed radio frequency spectrum band, that are semi-static or permanent.

8. The method of claim 7, wherein the one or more fixed channels are used for at least one of:
   transmission of at least one SIB of the one or more SIBs,
   transmission of one or more pages,
   one or more positioning signals, or
   some combination thereof.

9. The method of claim 1, wherein the MIB or the one or more SIBs indicate a number of channels for frequency hopping in the unlicensed radio frequency spectrum band.

10. The method of claim 9, wherein the number of channels is cell-specific.

11. The method of claim 1, wherein the MIB or the one or more SIBs are obtained based at least in part on:
   performing a radio resource control (RRC) configuration procedure,
   receiving an indication, in a common physical downlink control channel, that the list of channels has changed or will change,
   expiration of a modification period associated with the list of channels, or
   some combination thereof.

12. The method of claim 1, wherein one or more pages are searched for on a plurality of fixed channels using a paging window defined over a combination of discontinuous time intervals determined based at least in part on the frequency hopping pattern associated with the plurality of fixed channels.

13. The method of claim 1, wherein the value that indicates whether the list of channels has changed from the previously indicated list is configured to be N bits in length, wherein N is greater than or equal to two.

14. A method of wireless communication, comprising:
   transmitting, by a base station, a master information block (MIB) that indicates a location of one or more system information blocks (SIBs),
      wherein the MIB includes a value that indicates whether a list of channels permitted for use by a user equipment (UE) for frequency hopping in an unlicensed radio frequency spectrum band has changed from a previously indicated list;
   transmitting, by the base station, the one or more SIBS, wherein the one or more SIBs indicate the list of channels,
      the list of channels being indicated by at least one of:
         a whitelist of channels that can be used for frequency hopping, or
         a blacklist of channels that cannot be used for frequency hopping; and
   communicating, by the base station, with the UE using a plurality of channels included in the list of channels according to a frequency hopping pattern.

15. The method of claim 14, wherein an indication of the list of channels is transmitted based at least in part on a change to the list of channels.

16. The method of claim 14, wherein the list of channels corresponds to the base station and is indicated to one or more neighbor base stations.

17. The method of claim 14, wherein the list of channels is modified by adding to the list, removing from the list, or adding and removing from the list.

18. The method of claim 14, wherein a number of channels, included in the list of channels, is fixed and a first channel is added to the list of channels when a second channel is removed from the list of channels.

19. A user equipment (UE) for wireless communication, comprising:
   memory; and one or more processors operatively coupled to the memory, the memory and the one or more processors configured to:
receive a master information block (MIB) that indicates a location of one or more system information blocks (SIBs),
wherein the MIB includes a value that indicates whether a list of channels for frequency hopping in an unlicensed radio frequency spectrum band has changed from a previously indicated list;
receive the one or more SIBs based at least in part on the MIB, wherein the one or more SIBs indicate the list of channels,
the list of channels being indicated by at least one of:
a whitelist of channels that can be used for frequency hopping, or
a blacklist of channels that cannot be used for frequency hopping; and
communicate by frequency hopping on a plurality of channels, included in the list of channels, according to a frequency hopping pattern based at least in part on the indication in the one or more SIBs.

20. The UE of claim 19, wherein the MIB or the one or more SIBs are obtained based at least in part on receiving a page triggered by a change to the list of channels.

21. The UE of claim 19, wherein the list of channels is obtained based at least in part on determining that the list of channels has changed from the previously indicated list.

22. The UE of claim 19, wherein the one or more processors are further configured to read the value from the MIB and compare the value to a previously received value to determine whether the list of channels has changed from the previously indicated list.

23. The UE of claim 19, wherein the list of channels corresponds to a base station serving the UE or is associated with a neighbor base station.

24. The UE of claim 19, wherein the MIB or the one or more SIBs indicate one or more fixed channels, for communication in the unlicensed radio frequency spectrum band, that are semi-static or permanent.

25. The UE of claim 19, wherein the MIB or the one or more SIBs indicate a number of channels for frequency hopping in the unlicensed radio frequency spectrum band.

26. The UE of claim 19, wherein the MIB or the one or more SIBs are obtained based at least in part on:
performing a radio resource control (RRC) configuration procedure,
receiving an indication, in a common physical downlink control channel, that the list of channels has changed or will change,
expiration of a modification period associated with the list of channels, or some combination thereof.

27. The UE of claim 19, wherein one or more pages are searched for on a plurality of fixed channels using a paging window defined over a combination of discontinuous time intervals determined based at least in part on the frequency hopping pattern associated with the plurality of fixed channels.

28. The UE of claim 19, wherein the value that indicates whether the list of channels has changed from the previously indicated list is configured to be N bits in length,
wherein N is greater than or equal to two.

29. A base station for wireless communication, comprising:
memory; and
one or more processors operatively coupled to the memory, the memory and the one or more processors configured to:
transmit a master information block (MIB) that indicates a location of one or more system information blocks (SIBs),
wherein the MIB includes a value that indicates whether a list of channels permitted for use by a user equipment (UE) for frequency hopping in an unlicensed radio frequency spectrum band has changed from a previously indicated list;
transmit the one or more SIBs, wherein the one or more SIBs indicate the list of channels,
the list of channels being indicated by at least one of:
a whitelist of channels that can be used for frequency hopping, or
a blacklist of channels that cannot be used for frequency hopping; and
communicate with the UE using a plurality of channels included in the list of channels according to a frequency hopping pattern.

30. The base station of claim 29, wherein the one or more processors are further configured to transmit an indication that the list of channels has changed based at least in part on a determination that the list of channels has changed.

* * * * *